US010068313B2

(12) United States Patent
Lee

(10) Patent No.: US 10,068,313 B2
(45) Date of Patent: Sep. 4, 2018

(54) REMOTE MANAGEMENT SYSTEM SUPPORTING N-SCREEN FUNCTION

(71) Applicant: LSIS CO., LTD., Gyeonggi-do (KR)

(72) Inventor: Seung-Ju Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/354,198

(22) Filed: Nov. 17, 2016

(65) Prior Publication Data
US 2017/0287110 A1    Oct. 5, 2017

(30) Foreign Application Priority Data

Apr. 4, 2016 (KR) .......................... 10-2016-0040976

(51) Int. Cl.
*G06T 11/20* (2006.01)
*G06T 3/40* (2006.01)
(Continued)

(52) U.S. Cl.
CPC .......... *G06T 3/4092* (2013.01); *G06F 3/1454* (2013.01); *H04N 21/234327* (2013.01);
(Continued)

(58) Field of Classification Search
CPC ............... H04Q 9/00; H04N 21/42204; H04N 21/2662; H04N 21/234327; G06F 3/1454; G06T 3/4092
See application file for complete search history.

(56) References Cited

U.S. PATENT DOCUMENTS 7,908,019 B2    3/2011 Ebrom et al.
9,143,839 B2 *  9/2015 Reisman ........... G06F 17/30873
(Continued)

FOREIGN PATENT DOCUMENTS

EP    2495624 A2    5/2012
GB    2520334 A     5/2015
(Continued)

OTHER PUBLICATIONS

Korean office action dated Jul. 24, 2017 for corresponding Korean application 1020160040976.
(Continued)

*Primary Examiner* — Robert Craddock
(74) *Attorney, Agent, or Firm* — K&L Gates LLP

(57) ABSTRACT

The present disclosure relates to a remote management system supporting an N-screen function. A remote management system according to one embodiment of the present disclosure includes a graphic editing unit configured to create a first file including a plurality of layers corresponding to resolutions of plurality of devices, and a remote server configured to verify resolution of a remote terminal and an application standard thereof when receiving a monitoring screen provision request from the remote terminal, and to create a second file corresponding to the resolution of the remote terminal and the application standard thereof, thereby providing the second file to the remote terminal. In accordance with the present disclosure, a graphic file capable of displaying the same monitoring screen on a plurality of devices having a variety of resolutions may be created using a single graphic editing tool, thereby dramatically improving convenience of a system management.

6 Claims, 4 Drawing Sheets

(51) Int. Cl.
    G06F 3/14      (2006.01)
    H04N 21/2343   (2011.01)
    H04N 21/2662   (2011.01)
    H04N 21/422    (2011.01)
    H04Q 9/00      (2006.01)
(52) U.S. Cl.
    CPC ... *H04N 21/2662* (2013.01); *H04N 21/42204* (2013.01); *H04Q 9/00* (2013.01)

(56) References Cited

U.S. PATENT DOCUMENTS

| | | |
|---|---|---|
| 2007/0058937 A1 | 3/2007 | Ando et al. |
| 2008/0082482 A1 | 4/2008 | Amon et al. |
| 2012/0306620 A1 | 12/2012 | Karaffa et al. |
| 2013/0285937 A1 | 10/2013 | Billings et al. |

FOREIGN PATENT DOCUMENTS

| | | |
|---|---|---|
| JP | 2013114424 A | 6/2013 |
| JP | 2015053036 A | 3/2015 |
| KR | 101253492 B1 | 4/2013 |
| KR | 20130044616 A | 5/2013 |
| KR | 1020130073770 A | 7/2013 |
| KR | 20140128579 A | 11/2014 |
| KR | 20150026303 A | 3/2015 |
| WO | 03/096669 A2 | 11/2003 |
| WO | 2004036327 A1 | 4/2004 |
| WO | 2014/155017 A1 | 10/2014 |

OTHER PUBLICATIONS

Lee, Kyong-Ho et al., "Implementation of N-screen based solar power monitoring system", Journal of the Korea Society of Computer Information 19(10), pp. 151-158, Oct. 2014.

Extended Search Report dated May 4, 2017 issued in corresponding European Application No. 16198614.6.

European Office Action for related European Application No. 16198614.6; action dated Jun. 27, 2018; (7 pages).

* cited by examiner

REMOTE MANAGEMENT SYSTEM SUPPORTING N-SCREEN FUNCTION

CROSS REFERENCE TO RELATED APPLICATION

This application claims the benefit of Korean Patent Application No. 10-2016-0040976, filed on Apr. 4, 2016, entitled "REMOTE MANAGEMENT SYSTEM SUPPORTING N-SCREEN FUNCTION", which is hereby incorporated by reference in its entirety into this application

BACKGROUND

1. Technical Field

The present disclosure relates to a remote management system supporting an N-screen function.

2. Description of the Related Art

Recently, a demand is growing for monitoring a sensed value of equipment installed at a field through a supervisory control and data acquisition (SCADA) system, a distributed control system (DCS), an energy management system (EMS), a micro grid (MG) system, and the like. In addition, a demand is also growing for remotely controlling various equipment. A user monitors such a sensed value through a monitoring screen displayed via a terminal device such as a computer, and gives a control instruction.

Lately, in addition to computers, terminal devices which have various resolutions are recently used, such as a smart phone, a tablet PC, and the like. Along with this, the function is provided that displays the same screen as one displayed on a computer on other devices such as a smart phone or a tablet PC. Such function is referred to as an N-screen function.

According to the related art, however, a manager should separately create a monitoring screen corresponding to each device using a separate graphic editing tool that is able to support resolution of each device so as to provide an N-screen function. As a result, there are problems in that the creating of the monitoring screen requires more time and also management and maintenance of a system is difficult.

SUMMARY

An object of the present disclosure is to provide a remote management system capable of displaying the same monitoring screen on a plurality of devices having a variety of resolutions using a single graphic editing tool.

The object of the present disclosure is not limited to the above described object, and other objects not mentioned above will be apparently understood by those skilled in the art from the following description.

A remote management system according to one embodiment of the present disclosure includes a graphic editing unit configured to create a first file including a plurality of layers corresponding to resolutions of a plurality of devices, and a remote server configured to verify resolution and an application standard of a remote terminal when receiving a monitoring screen provision request from the remote terminal, and to create a second file corresponding to the resolution of the remote terminal and the application standard thereof, thereby providing the second file to the remote terminal.

In accordance with the present disclosure, a graphic file capable of displaying the same monitoring screen on a plurality of devices having a variety of resolutions may be created using a single graphic editing tool, thereby dramatically improving convenience of a system management.

DETAILED DESCRIPTION

Figure 1:
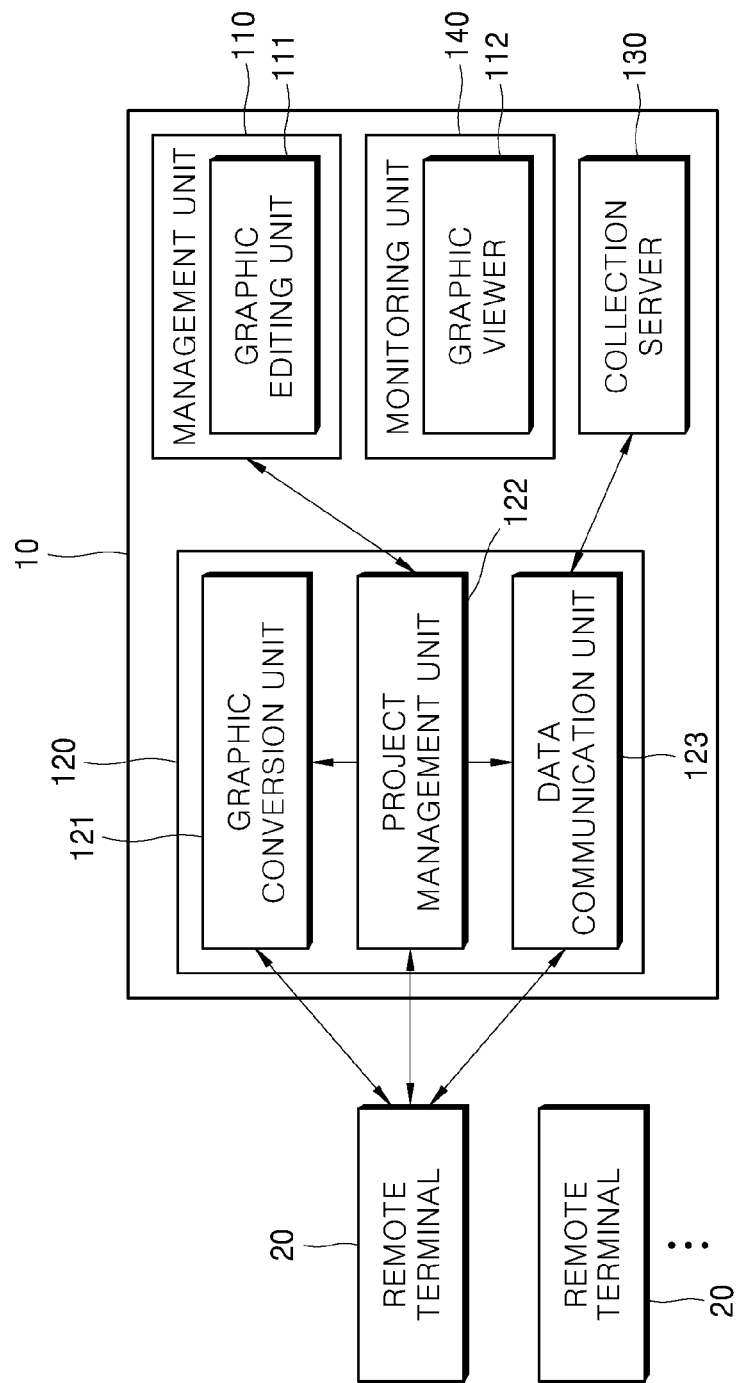
FIG. 1 is a block diagram illustrating an N-screen service-based remote management system according to an embodiment of the present disclosure.

The above and other objects, features and advantages of the present disclosure will be described later in detail with reference to the accompanying drawings, and thus the technical spirit of the present disclosure can be easily implemented by those skilled in the art. In the following description of the present disclosure, if a detailed description of known configurations and functions is determined to obscure the interpretation of embodiments of the present disclosure, the detailed description thereof will be omitted. Hereinafter, preferred embodiments according to the present disclosure will be described in detail with reference to the accompanying drawings. In the drawings, the same reference numerals refer to the same or similar elements throughout.

Figure 2:
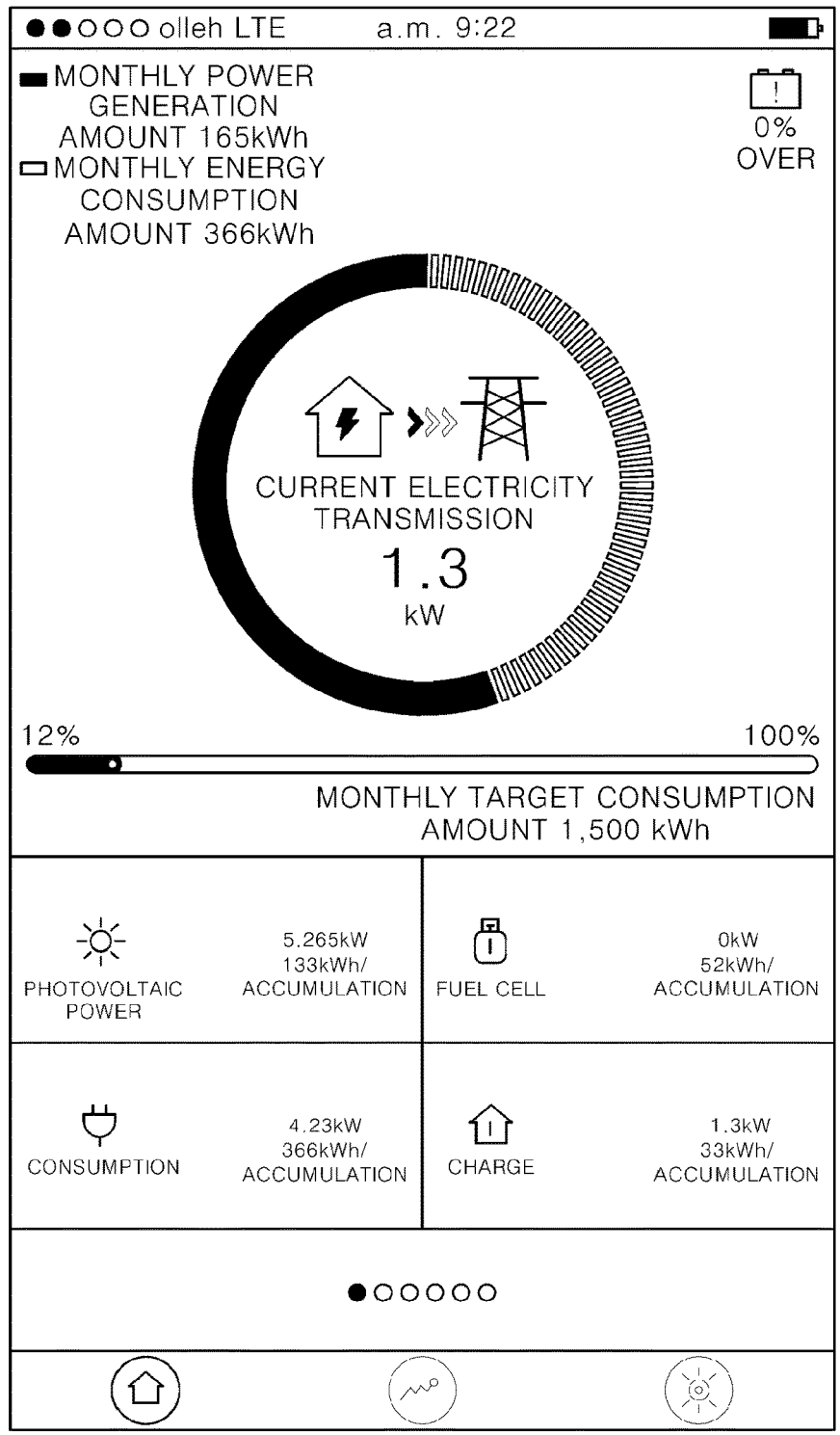
FIG. 2 is an exemplary diagram of a monitoring screen displayed on a single remote terminal according to an embodiment of the present disclosure.

FIG. 1 is a block diagram illustrating an N-screen service-based remote management system according to an embodiment of the present disclosure, and FIG. 2 is an exemplary diagram of a monitoring screen displayed on a remote terminal according to an embodiment of the present disclosure.

As shown in FIG. 1, a remote management system 10 according to an embodiment of the present disclosure includes a collection server 130, a management unit 110, a monitoring unit 140, and a remote server 120. For reference, the remote management system 10 according to the embodiment of the present disclosure may not include the collection server 130.

The collection server 130 collects and stores therein sensed values of sensors installed at least one field that should be monitored. At this point, the collection server 130 may store the sensed values of the sensors installed at the field by discriminating these values from each other using a sensor unique identifier and the like. Here, the field may be a spot or site, such as a subway, a factory and the like, which is remotely monitored and controlled by a remote management system.

In one embodiment of the present disclosure, the connection server 130 may be a server that collects and stores a sensed value through a supervisory control and data acquisition (SCADA) system, a distributed control system (DCS), an energy management system (EMS), a micro grid (MG) system.

The management unit 110 creates a first file including a monitoring screen on which positions of sensors installed at the field and sensed values of the sensors are displayed, to provide the remote server 120 with the first file. At this point, the positions and functions of the sensors and related calculated values using each of the sensed values (for example, accumulated values of the sensed values) may be displayed on the monitoring screen. In an embodiment of FIGS. 1 and 2, it will be described as an example for a case in which a monitoring screen displays positions of sensors and sensed values thereof. In one embodiment of the present disclosure, the management unit 110 may be an engineering workstation (EWS) of the remote management system 10.

A graphic editing unit 111 creates the first file including a monitoring screen which includes display positions at each layer of the monitoring screen regarding positions, functions, and sensed values or calculated values of sensors installed at the field.

At this point, the first file is configured with a plurality of layers so as to allow the same monitoring screen to be displayed on each of a plurality of devices having resolutions different from each other. In one embodiment of the present disclosure, the first file may be a file of an extensible markup language (XML) standard compatible with a hypertext markup language 5 (HTML5) standard.

A graphic viewer 112 provides the monitoring screen to the monitoring unit 140 using the first file that is created or updated through the graphic editing unit 111. At this point, the graphic viewer 112 may provide the monitoring screen by activating a layer corresponding to resolution of the monitoring unit 140 among the plurality of layers included in the first file.

The remote server 120 receives a monitoring screen provision request from a remote terminal 20. When receiving the monitoring screen provision request from the remote terminal 20, the remote server 120 creates a second file including a monitoring screen corresponding to resolution and an application standard of the remote terminal 20 using the first file. Thereafter, the remote server 120 provides the created second file to the remote terminal 20. In one embodiment of the present disclosure, the remote server 120 may be a web application server (WAS) supporting the HTML5 standard.

The remote server 120 includes a project management unit 122, a graphic conversion unit 121, and a data communication unit 123. Hereinafter, each component of the remote server 120 will be described.

When verifying the monitoring screen provision request of the remote terminal 20, the project management unit 122 verifies resolution of the remote terminal 20 and an application standard thereof (for example, HTML5) based on the monitoring screen provision request. Thereafter, the project management unit 122 loads a first file corresponding to the monitoring screen provision request of the remote terminal 20 to transfer the loaded first file to the graphic conversion unit 121.

The graphic conversion unit 121 activates a layer corresponding to the resolution of the remote terminal 20 among the plurality of layers included in the first file and inactivates the remaining layers thereamong. At this point, in addition to the layer corresponding to the resolution of the remote terminal 20, the graphic conversion unit 121 may further activate a basic layer required for displaying the monitoring screen.

Here, the graphic conversion unit 121 may use the first file including the monitoring screen that is most recently received from the management unit 110.

The graphic conversion unit 121 converts the first file, in which the layer corresponding to the resolution of the remote terminal 20 is activated, into a second file corresponding to an application standard of the remote terminal 20. Such a converted second file is transmitted to the remote terminal 20 through the data communication unit 123 or other communication means (not shown).

The data communication unit 123 periodically receives at least one of sensed values and calculated values of the sensors installed at the field from the collection server 130, thereby providing the received value to the remote terminal 20. At this point, a data transmission period of the data communication unit 123 may be set in advance by the manager. Also, the data transmission period of the data communication unit 123, which is set in advance by the manager, may be recorded in the first file.

In another embodiment of the present disclosure, the data transmission period of the data communication unit 123 may be set by a user of the remote terminal 20.

In still another embodiment, the data communication unit 123 may transmit sensed values and calculated values to the remote terminal 20 in a data transmission period the same as that at the collection server that receives the sensed values and the calculated values of the sensors installed at the field.

Through the above described operation, the data communication unit 123 may provide the remote terminal 20 with sensed values and calculated values whenever receiving the sensed values and the calculated values from the collection server 130.

In yet another embodiment, the data communication unit 123 may set a data transmission period in response to kinds of a sensed value and a calculated value received at the collection server 130. More particularly, the data communication unit 123 may set the data transmission period to be long when a sensed value and a calculated value, which have a large data size, are received at the collection server 130. On the contrary, the data communication unit 123 may set the data transmission period to be short when a sensed value and a calculated value, which have a small data size, are received at the collection server 130.

Through the above described operation, the data communication unit 123 may reduce a communication load generated when transmitting and receiving the sensed values and the calculated values.

In one embodiment of the present disclosure, when receiving the monitoring screen provision request from the remote terminal 20, the data communication unit 123 may periodically provide the sensed values and the calculated values to the remote terminal 20 before a monitoring screen provision interruption request is transmitted therefrom. Such a method is referred to as a publication/subscription (Pub/Sub) method. If the sensed values or the calculation values are provided to the remote terminal 20 according to a data update request thereof, a communication load may be excessively increased. Therefore, the data communication 123 according to the present disclosure automatically transmits data to the remote terminal 20 according to a data transmission period that is set in advance from a time when receiving the monitoring screen provision request from the remote terminal 20 to a time when receiving the monitoring screen provision interruption request therefrom.

The remote terminal 20 transmits the monitoring screen provision request to the remote server 120, and receives a second file as a response of the transmitted request. The remote terminal 20 displays the received second file through a specific application (for example, a browser and the like).

Hereinafter, a monitoring screen displayed on the remote terminal 20 will be described with reference to FIG. 2. In FIG. 2, the remote management system 10 is an example of an energy management system (EMS).

A monitoring screen according to FIG. 2 is a screen for display positions, functions, and sensed values of sensors installed at the field. In the embodiment of FIG. 2, the sensors installed at the field are sensors for sensing a photovoltaic power generation amount, a fuel cell amount, an electricity consumption amount, and an electricity transmission amount. Therefore, the sensed values displayed on the monitoring screen are a photovoltaic power generation amount, a fuel cell amount, an electricity consumption amount, and an electricity transmission amount which are sensed by the sensors. At this point, a calculated value is an accumulated value of each of the sensed values during a predetermined period.

In the present disclosure, a single monitoring screen such as FIG. 2 is stored in a single file as a plurality of layers. That is, when editing a monitoring screen such as FIG. 2, the manager may create a monitoring screen of a variety of resolutions with a single graphic editing tool instead of using a plurality of graphic editing tools in consideration of resolution of each device as in the related art. As a result, in accordance with the present disclosure, the manager may more easily and rapidly edit the monitoring screen.

Figure 3:
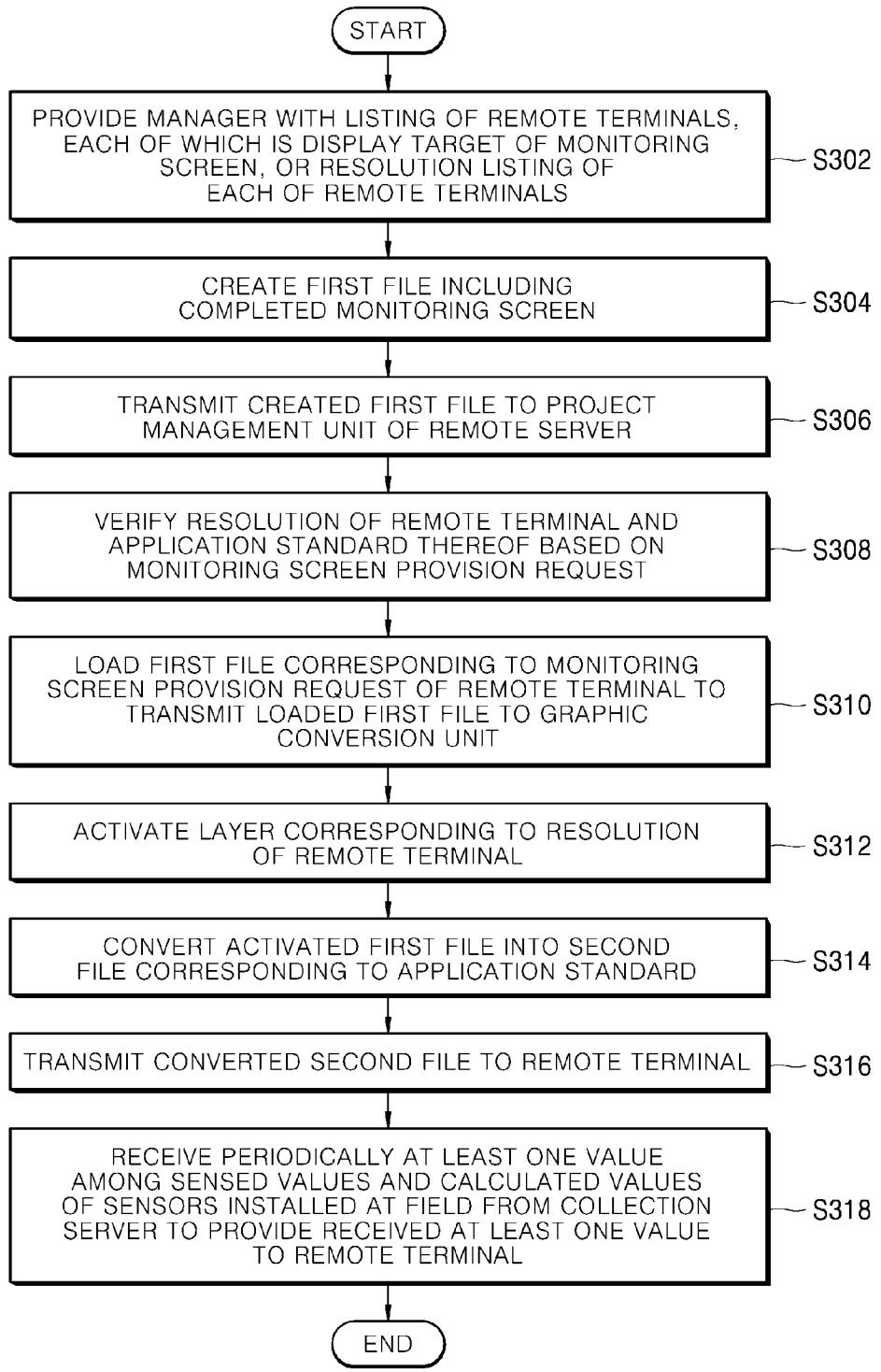
FIG. 3 is a flow chart illustrating a monitoring screen creation process by a manager according to an embodiment of the present disclosure.
Figure 4:
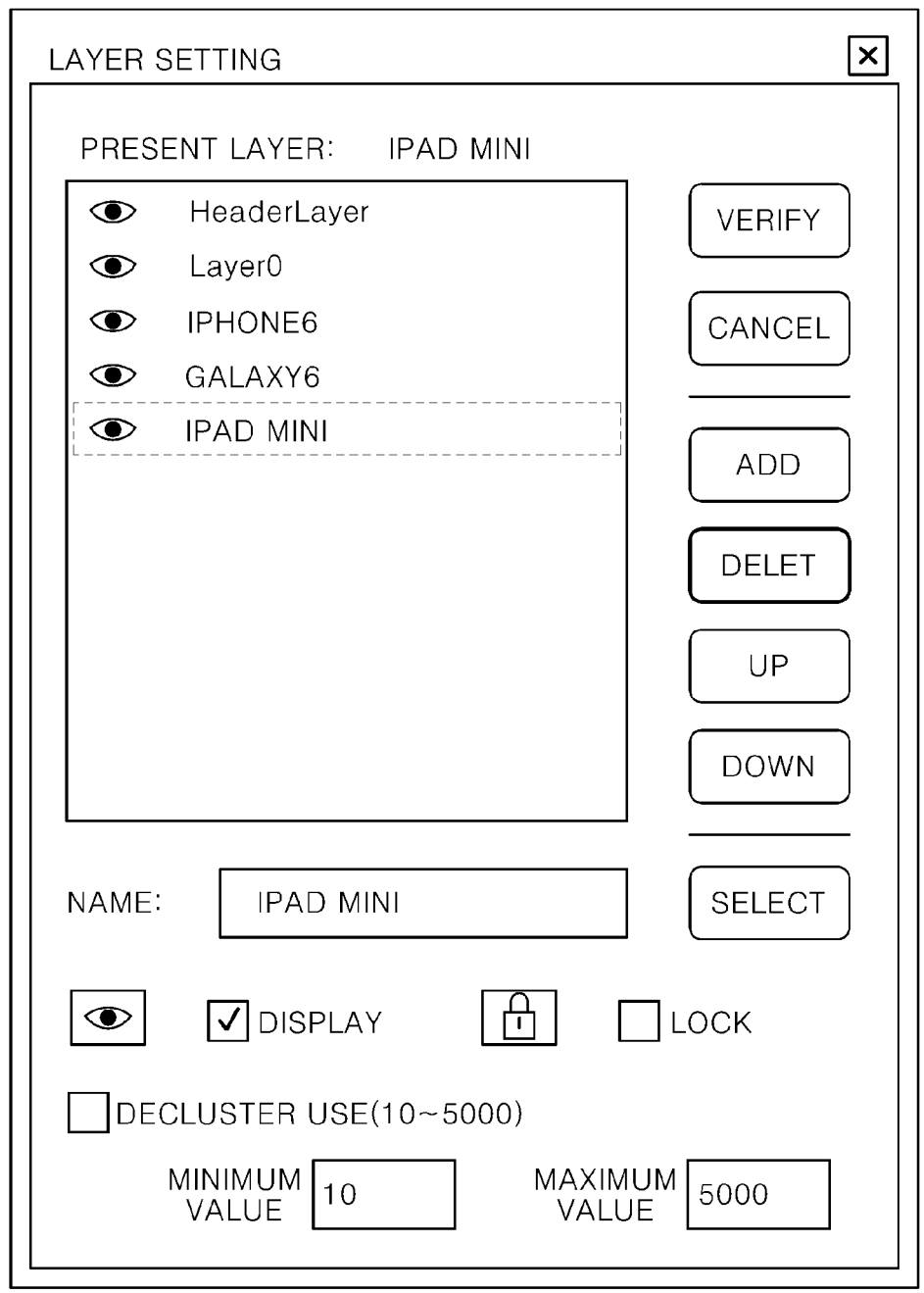
FIG. 4 is a screen for setting a layer in the monitoring screen creation process according to the embodiment of the present disclosure.

Hereinafter, a monitoring screen creation process according to an embodiment of the present disclosure will be described with reference to FIGS. 3 and 4. FIG. 3 is a flow chart illustrating a monitoring screen creation process through a graphic editing unit according to an embodiment of the present disclosure, and FIG. 4 illustrates a screen for setting a layer in the monitoring screen creation process according to the embodiment of the present disclosure.

Firstly, the graphic editing unit 111 provides the manager with a listing of remote terminals, each of which is a display target of a monitoring screen, or a resolution listing of each of the remote terminals in Operation S302. The manager may select one or more desired remote terminals or resolutions from the listings provided by the graphic editing unit 111. Consequently, resolution and a layer corresponding to the resolution, which are to be included in a first file for which the manager is willing to create, are determined.

Thereafter, the manager edits the monitoring screen while displaying or not displaying at least one among the plurality of selected layers on a display of the graphic editing unit 111. The manager creates the monitoring screen suitable for each layer displayed on the display by adjusting a position and a function of the sensor, a position of the sensed value, a position of the calculated value, and the like. It may be preferable for the manager to create the monitoring screen with respect to each of all the layers which are previously selected.

When the creating of the monitoring screen has been completed by the manager, the graphic editing unit 111 creates a first file including the completed monitoring screen in Operation S304. At this point, the plurality of layers selected by the manager are included in the created first file.

Next, the graphic editing unit 111 transmits the created first file to the project management unit 122 of the remote server 120 in Operation S306.

The project management unit 122 receives a monitoring screen provision request from the remote terminal 20 in Operation S306, and verifies resolution of the remote terminal 20 and an application standard thereof based on the monitoring screen provision request in Operation S308. Thereafter, the project management unit 122 loads the first file corresponding to the monitoring screen provision request of the remote terminal 20 and transfers the loaded first file to the graphic conversion unit 121 in Operation S310.

The graphic conversion unit 121 activates a layer corresponding to the resolution of the remote terminal 20 in Operation S312, and converts the activated first file into a second file corresponding to the application standard of the remote terminal 20 in Operation S314. Such a converted second file is transmitted to the remote terminal 20 through the data transmission unit 123 or other communication means (not shown) in Operation S316.

The data communication unit 123 periodically receives at least one among sensed values and calculated values of the sensors installed at the field to provide the received at least one value to the remote terminal 20 in Operation S318.

As described above, in accordance with the present disclosure, a graphic file capable of displaying the same monitoring screen on a plurality of devices having a variety of resolutions may be created using a single graphic editing tool, thereby dramatically improving convenience of a system management.

Further, in accordance with the present disclosure, a single file configured with a plurality of layers may be created and distributed to provide a plurality of devices with a monitoring function, thereby increasing convenience of management and maintenance of a system.

Although the present disclosure has been described with reference to the embodiments, it should be understood that numerous other substitutions, modifications and alterations can be devised by those skilled in the art without departing the technical spirit of this disclosure, and thus it should be construed that the present disclosure is not limited by the embodiments described above and the accompanying drawings.

What is claimed is:

1. A remote management system for providing a monitoring screen displayable on a plurality of devices having resolutions different from each other, comprising:
   a graphic editing unit configured to create a first file including a plurality of layers corresponding to the resolutions of the plurality of devices, respectively; and
   a remote server configured to verify a resolution and an application standard of a remote terminal upon receiving a monitoring screen provision request from the remote terminal, and to create a second file corresponding to the resolution of the remote terminal and the application standard thereof, thereby providing the second file to the remote terminal;
   wherein the remote server includes:
   a graphic conversion unit configured to activate a layer corresponding to the resolution of the remote terminal among the plurality of layers included in the first file, to deactivate the remaining layers of the plurality of layers, and to create the second file corresponding to the application standard of the remote terminal based on the activated layer.

2. The remote management system of claim 1, wherein the remote server further includes:
   a project management unit configured to verify the resolution of the remote terminal and the application standard thereof when receiving the monitoring screen provision request from the remote terminal, and to control the graphic conversion unit to create the second file corresponding to the resolution of the remote terminal and the application standard thereof.

3. The remote management system of claim 1, wherein the remote server includes:
   a data communication unit configured to periodically receive at least one value among sensed values and calculated values of sensors from a collection server, thereby transmitting the received at least one value to the remote terminal.

4. The remote management system of claim 3, wherein the data communication unit transmits at least one value among the sensed values and the calculated values to the remote terminal according to a data transmission period that is set in advance, from a time when receiving the monitoring screen provision request from the remote terminal to a time when receiving a monitoring screen provision interruption request from the remote terminal.

5. The remote management system of claim 3, wherein the data communication unit transmits at least one value among the sensed values and the calculated values to the remote terminal from a time when receiving the monitoring screen provision request from the remote terminal to a time when receiving a monitoring screen provision interruption request from the remote terminal.

6. The remote management system of claim 1, wherein the graphic editing unit provides a listing of remote terminals which are to be a display target of the monitoring screen and a resolution listing thereof.

\* \* \* \* \*